United States Patent [19]

Heizmann et al.

[11] Patent Number: 4,968,146
[45] Date of Patent: Nov. 6, 1990

[54] OPTICAL DEPTH MEASURING DEVICE TO BE MOUNTED ON DRILLING POWER TOOL

[75] Inventors: Frieder Heizmann, Denens; Christian Lietar, Morges; Raymond Pidoux, Vufflens-le-Chateau, all of Switzerland

[73] Assignee: Robert Bosch GmbH, Stuttgart, Fed. Rep. of Germany

[21] Appl. No.: 272,884

[22] PCT Filed: Apr. 11, 1987

[86] PCT No.: PCT/DE87/00168
§ 371 Date: Nov. 10, 1988
§ 102(e) Date: Nov. 10, 1988

[87] PCT Pub. No.: WO87/07008
PCT Pub. Date: Nov. 19, 1987

[30] Foreign Application Priority Data

May 10, 1986 [DE] Fed. Rep. of Germany ....... 3615875

[51] Int. Cl.⁵ .............................................. G01B 11/22
[52] U.S. Cl. .................................... 356/375; 356/1; 408/16
[58] Field of Search ................... 356/1, 372, 373, 375, 356/378; 408/13, 16

[56] References Cited

U.S. PATENT DOCUMENTS 4,761,072  8/1988  Pryor ..................................... 356/1

FOREIGN PATENT DOCUMENTS 2838968  3/1980  Fed. Rep. of Germany ........ 408/16
3126245  1/1983  Fed. Rep. of Germany ........ 408/16
2483278 12/1981  France ................................. 408/16
 136933  8/1979  German Democratic Rep. ... 408/16

*Primary Examiner*—F. L. Evans
*Attorney, Agent, or Firm*—Michael J. Striker

[57] ABSTRACT

An optical depth measuring device for use with a drilling power tool for drilling a bore in a workpiece and comprising a radiation source for projecting an optical pattern onto a surface of the workpiece, a radiation receiver for receiving an image reflected from the surface of the workpiece, a conveying lens located in front of the radiation receiver for directing the reflected image and signal processing means for continuously determining the depth of the drilled bore in accordance with the image received by the radiation receiver.

9 Claims, 3 Drawing Sheets

OPTICAL DEPTH MEASURING DEVICE TO BE MOUNTED ON DRILLING POWER TOOL

BACKGROUND OF THE INVENTION

The invention relates to a hand-held machine tool preferably a drilling power tool. A drilling power tool is disclosed in DE-OS 31 26 245. In the known drilling power tool a profile rod is used for bore depth measurement and is made of a plastic material or metal. It extends parallel to the tool axis. The profile rod is displaceable along the tool axis in a holder which is fastened to the drilling tool. The profile rod can be locked by tightening a wing screw. It is tightened so as to project forward far enough so that the front tip of the rod abuts the workpiece when a predetermined bore depth is reached. A disadvantage of this measuring device is that the projecting distance of the rod and accordingly the predeterminable bore depth can only be roughly set as measured with the eye. It may happen that an unintentional longitudinal displacement of the rod occurs during tightening of the wing screw. Another disadvantage is that the reference point of the measurement is at a relatively far distance from the bore. The bore depth measurement range is defined by the length of the profile rod, which may not exceed a certain dimension for reasons of stability.

SUMMARY OF THE INVENTION

The object of the invention is a power tool having means which enables a high degree of accuracy in measuring the bore depth. According to the invention, measurement of the distance of the hand-held drilling tool from a workpiece to be machined is effected by the method of triangulation, known per se, which possesses a high degree of measuring accuracy. A radiation source, which projects an optical pattern onto a surface of the workpiece, and a radiation receiver, which is struck by the radiation reflected from the surface, are provided. There are no movable parts in the measuring device.

A semiconductor radiation source is preferably provided as a radiation source. A light diode, which emits a radiation in the visible spectral range, so that the reference point of the measurement is visible on the object to be processed, is particularly suitable for this purpose. Pulsed operation of the light diode enables a high pulse radiation output. The lower energy consumption in pulsed operation is noticeable in a particularly advantageous manner in battery-operated devices.

A high signal-to-noise ratio is achieved when the light diode is arranged in the focal point of a first collecting lens and the radiation receiver is arranged in the image plane of a second collecting lens located between the radiation receiver and the workpiece to be machined.

There are a number of possibilities of designing the radiation receiver, each of which has specific advantages.

In a first embodiment, the radiation receiver comprises radiation sensors first and second sensor, an optical beam splitter, and an additional optical structural component element arranged in front of the first radiation sensor. The optical structural component element can be a plane passband filter with a location-dependent transmission coefficient or a diaphragm with a location-dependent opening. The second radiation sensor provides a reference signal for the output signal of the first radiation sensor which is responsible for a position detection. The advantage of this arrangement consists in that the simplest radiation sensors, e.g. photodiodes, can be employed, and the measurement results are independent from the reflection coefficient of the surface to be machined.

In a second embodiment, a single plane radiation receiver is used, in front of which an optical structural component element is provided which comprises radiolucent and radiopaque regions. An optical grating is preferably used in this case. The quantity of counting pulses resulting from an interruption or transmission of the radiation, respectively, is a measure for a change in the distance. This construction can be modified in an advantageous manner by using a second radiation sensor and a second grating, wherein the radiolucent and radiopaque regions, respectively, of the two optical gratings are offset relative to one another, so that the direction of the change in the distance can be determined.

In a third embodiment, an arrangement comprising many individual sensors is used as a radiation receiver. Photodiode lines and charged-coupled-device (CCD) lines can be used.

A radiation signal is processed in a signal processing arrangement which includes optical and acoustic output devices, as well as a data input device. If the distance measuring device is provided for a drilling power tool, then the bore depth which is reached is calculated in this arrangement from the change in the distance. A desired depth can be predetermined by the input device. The optical output device displays a calculated bore depth, or the existing difference relative to the predetermined depth, in a continuous manner. A warning signal can be transmitted shortly before reaching the predetermined depth with the acoustic output device, so that an operator can reduce the feed force exerted on the hand-held power tool in due time.

The entire distance measurement device is secured in a removable handle of the hand-held power tool or integrated directly in the housing of the hand-held power tool.

The invention both to its construction so to its method of operation, together with additional objects and advantages thereof, will be best understood from the following description of the preferred embodiments with reference to the accompanying drawings wherein:

FIG. 1 shows schematically an optical arrangement of a depth measuring device according to the present invention FIGS. 2 to 5 show different embodiments of a radiation receiver incorporated into the depth measuring device according to the present invention, and FIG. 6 shows a block wiring diagram of an optoelectronic arrangement.

DESCRIPTION OF THE EMBODIMENT EXAMPLES

Figure 1:
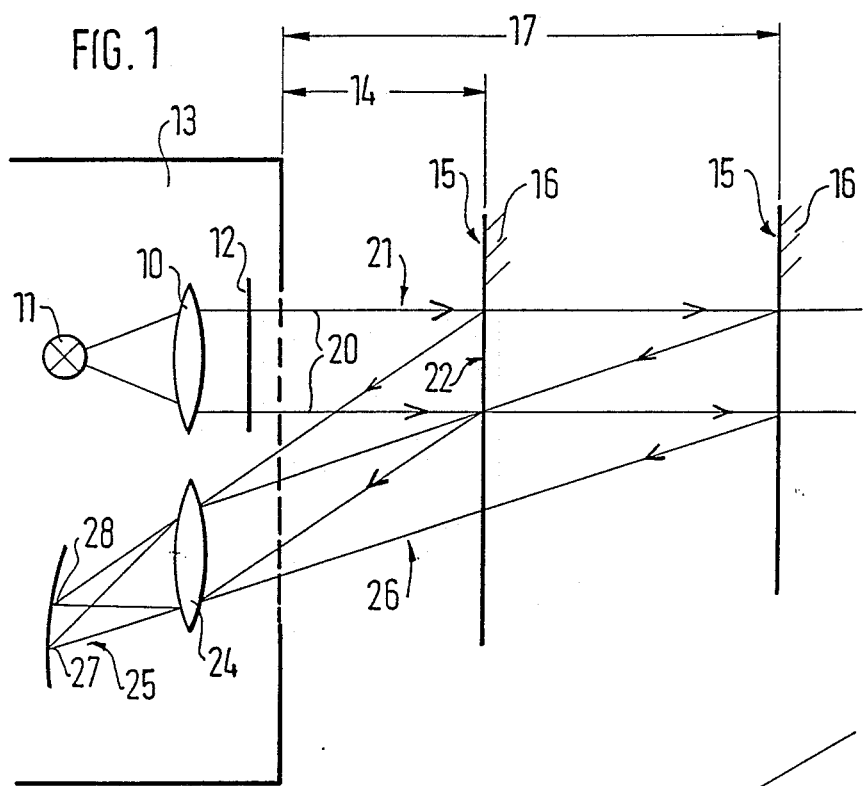

In FIG. 1, a radiation source 11 is arranged in the focal point of a first lens 10. A diaphragm 12 is located in front of the first lens 10. The first lens 10, the radiation source 11, and the diaphragm 12 are arranged inside a hand-held power tool 13. A surface 15 of a workpiece 16 to be machined is located at a first distance 17 from the power tool 13. During machining, the first distance 17 changes relative to a second distance 14. Boundary rays of the radiation 21 emitted by the radiation source 11 are designated by 20. The boundary rays 20 define an irradiated portion 22 of the surface 15 of the workpiece 16 to be machined. The irradiated surface portion 22 is imaged in an image area 25 with a second converging lens 24. A first image 27 is assigned to a surface located at the second distance 14 from the hand-held power tool 13, and a second image 28 is assigned to a surface located at the first distance 17 from the hand-held machine tool.

Figure 2:
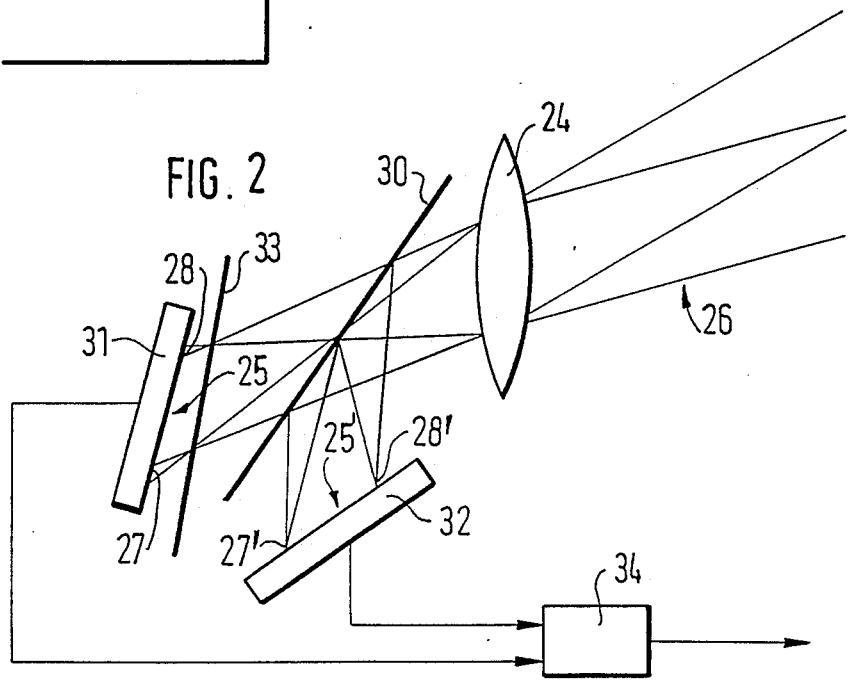

FIG. 2 shows a first embodiment of the radiation receiver incorporated into the depth measuring device according to the present invention. Radiation 26 reflected by the irradiated surface 22 strikes a beam splitter 30 after passing the second lens 24. The beam splitter 30 directs the incident radiation on a first radiation sensor 31 and on a second radiation sensor 32. The first sensor 31 is arranged in the image area 25 in which the first and second image points 27, 28 lie. An optical structural component element 33 is located in front of the latter. The output signals of the first and second sensors 31, 32 arrive in a signal processing arrangement 34.

Figure 3:
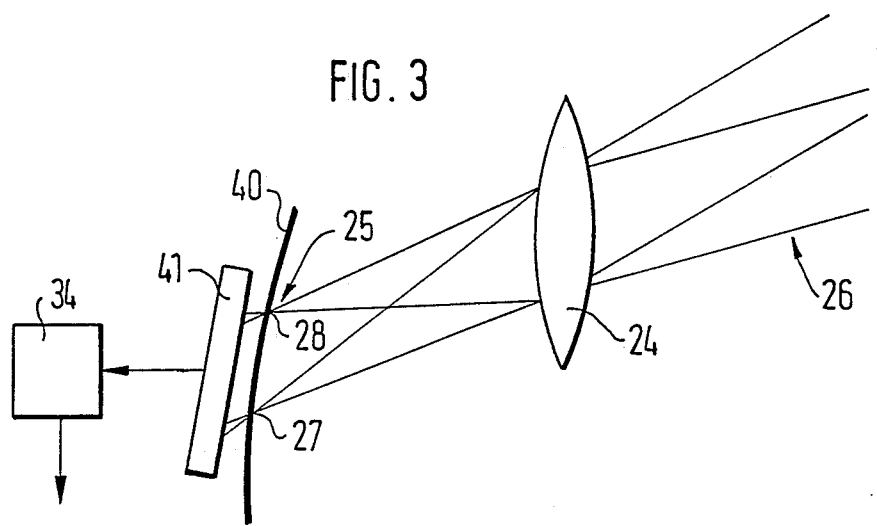

FIG. 3 shows a second embodiment of the radiation receiver. The second lens 24 images the radiation 26 reflected by the irradiated surface 22 on an optical structural component element 40. The optical structural component element 40 is arranged in the image area 25 in which the two image points 27, 28 lie. A radiation sensor 41 is provided so as to be closely adjacent to the optical structural component element 40 and transmits an output signal to the signal processing arrangement 34.

Figure 4:
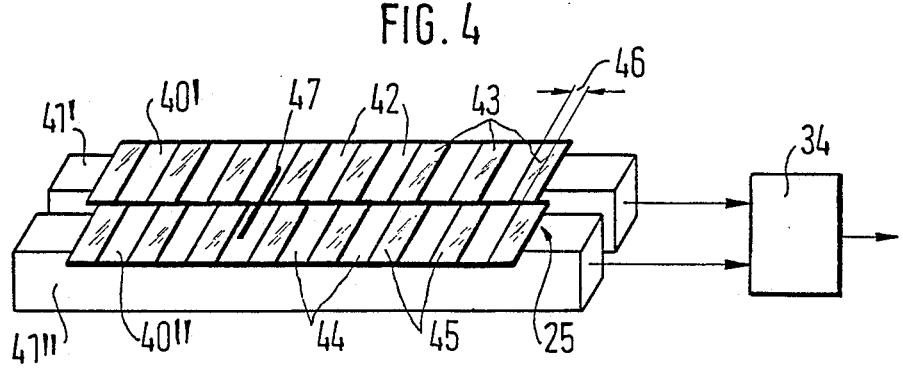

FIG. 4 shows a third embodiment of a radiation receiver. The optical structural component element 40 and the radiation sensor 41, according to FIG. 3, are doubled 40', 40", 41', 41". Radiolucent regions of the optical structural component element 40, assigned to one radiation sensor 41, are arranged in the image area 25 so as to be offset relative to the radiolucent regions 44, and radiopaque regions 45 of the optical structural component part 40" assigned to the other radiation sensor 41" are arranged so as to be offset relative to one another. A radiation pattern striking the radiation receiver 40', 40", 41', 41" is designated by 47. The two sensors 41', 41" transmit a signal to the signal processing arrangement 34.

Figure 5:
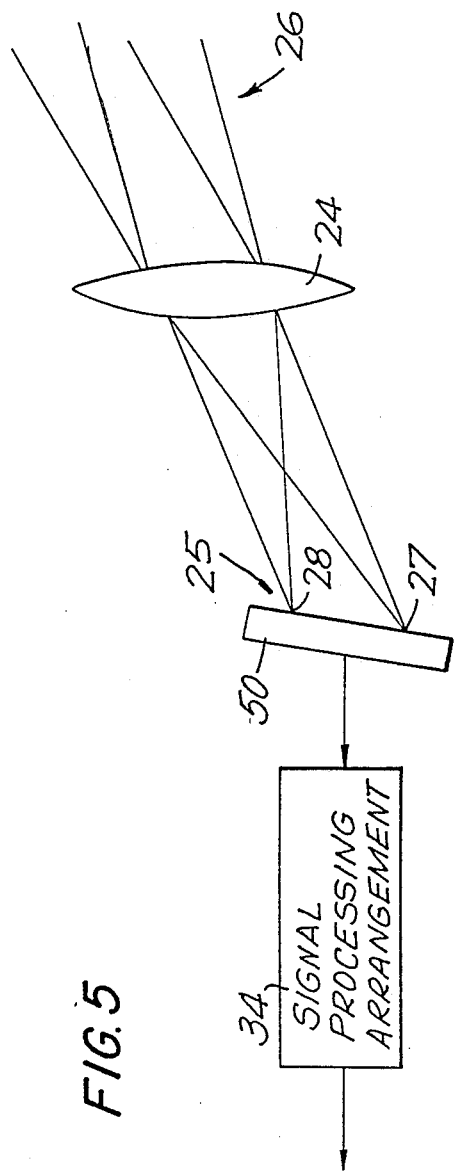

FIG. 5 shows a fourth embodiment of a radiation receiver. The radiation 26 reflected by the irradiated surface 22 is imaged on a radiation sensor 50 by the second lens 24, the sensitive surface of the radiation sensor 50 lying in the image area 25. In this embodiment, the radiation sensor 50 comprises a plurality of individual sensors or a position-sensitive photodiode.

Figure 6:
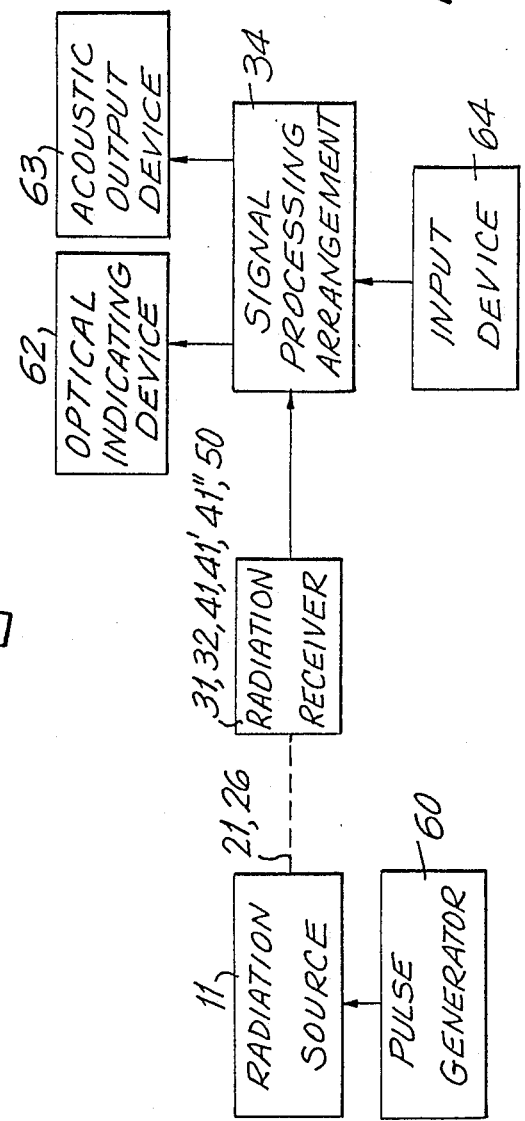

FIG. 6 shows a block wiring diagram of an optoelectronic arrangement. The radiation source 11 is controlled by a pulse generator 60. The optical radiation 21, 26 arrives on at least one radiation sensor 31, 32, 41, 41', 41", 50, whose output signal arrives in the signal processing arrangement 34. The signal processing arrangement 34 includes an optical and acoustic output device 62, 63 and an input device 64.

The distance measuring device, according to FIG. 1, operates in the following manner:

The radiation proceeding from the radiation source 11 is directed to the workpiece 16 by the first lens 10. If the radiation source 11 is located in the focal point of the first lens 10, which is designed as a collecting lens, a parallel bundle of rays of the emitted radiation 21 results which is defined by boundary rays 20. Determined radiation portions are blanked out with the diaphragm 12, which is arranged immediately adjacent to the first lens 10, in order to produce a determined optical pattern on the surface 15 of the workpiece 16. The emitted radiation 21 strikes a partial area 22 of the surface 15 to be processed and is scattered in a diffuse manner. The second lens 24, which is likewise designed as a collecting lens, receives a portion of the reflected radiation 26 and images the irradiated portion 22 of the surface 15 in the image area 25. A plane pattern of the radiation signal produced with the diaphragm 12 strikes the image area 25 of the second lens 24 as an image.

The optical device is secured in or at the hand-held power tool 13, whose distance 14, 17 from the surface 15 of the workpiece 18 is to be determined. The position of the image 27, 28 of the irradiated surface 22 in the image area 25 is an unequivocal function of this distance. For example, the imaging is effected in the first image 27 at a given second distance 14 and in the second image 28 at an existing first distance 17. This described method for measuring a determined distance is known, per se, in measuring technology as the triangulation method (VDI-Zeitung 125, (1983), No. 21, page 876). However, a continuous determination of a change in a distance during a manufacturing process by the triangulation method has not been disclosed until now.

In order to detect different positions of the images 27, 28, a radiation receiver is provided. FIG. 2 shows a first embodiment. After the reflected radiation 26 passes through the second lens 24, the radiation strikes the beam splitter 30. The beam splitter 30 is a semitransparent mirror whose reflection coefficient and transmission coefficient can amount to, e.g. 50% in each instance. The radiation transmitted by the beam splitter 30 strikes the first radiation sensor 31 after passing the optical structural component element 33. The first radiation sensor 31 is designed as a plane sensor which transmits an output signal regardless of the point of incidence, but as a function of the intensity of irradiation. The surface area of the sensor must be dimensioned in such a way that the image 27 of the surface 22 irradiated at the second distance 14 from the hand-held power tool 13, as well as the image 28 of the surface 22 located at the first distance 17, can strike the sensor surface. The sensor surface should conform to the image area 25 in order to achieve an optimally sharp imaging and, ideally, is slightly curved. The different positions of the two images 27, 28 must now be obtained from an output signal of the first sensor 31. This is possible by using the optical structural component element 33, which has a location-dependent transmission coefficient of a surface which is at least as large as that of the first sensor 31. The first and second image points 27, 28 therefore strike the first sensor 31 with a different intensity of irradiation and result in an output signal having a different level. However, the absolute value of the output signal of the first sensor 31 does not yet supply any unequivocal statement about the location of incidence of the image of the irradiated surface 22, since, depending on the nature of the workpiece 16, a considerably fluctuating reflection coefficient of the irradiated surface 22 must be taken into account, and different geometric relationships influence the ray intensity of the reflected radiation 26. The required normalization of the output signal of the first sensor 31 is effected in the signal processing arrangement 34, the output signal of the second radiation sensor 32 being fed to the latter for this purpose. The second radiation sensor 32 is constructed in a manner identical to the first sensor 31. The radiation reflected by the beam splitter 30 strikes the second sensor 32. It is also arranged as close as possible to the image area 25', so that the images 27', 28' of the irradiated surface 22 are imaged as sharply as possible on the surface of the second radiation sensor 32. Accordingly, a small sensor surface is also sufficient. No other optical structural component element is provided in the ray path between the beam splitter 30 and the second sensor 32. A division in the signal processing arrangement 34, with the output signal of the second sensor 32 as divisor and the output signal of the first sensor 31 as dividend, enables an unequivocal assignment of the positions of the images 27, 28 to the first sensor 31 regardless of the nature of the surface 22. As an alternative to the embodiment of the optical structural component element 33 as filter with location-dependent transmission coefficient, this structural component element can also be constructed as a diaphragm with location-dependent opening.

In the second embodiment of the radiation receiver, according to FIG. 3, the radiation 26 reflected by the irradiated surface 22 strikes the radiation sensor 41 after passing through the second lens 24 and the optical structural component element 40. The radiation sensor 41 is a plane sensor whose output signal is a function of the irradiation intensity, but not of the location of incidence on the active surface. The optical structural component element 40 comprises radiolucent and radiopaque regions. In an advantageous manner, an optical grating is used in this instance. The grating 40 is arranged in the image area 25. The grating 40 is preferably slightly curved corresponding to the image area 25, so that the images 27, 28 of the surface 22 which are sharply imaged in different image planes are sharply imaged on the grating 40. Optical distortion effects and geometric influences can also be compensated for by different distances between the radiolucent and radiopaque regions of the grating 40. The exact position of the sensor 41 behind the grating 40 is not critical as long as the radiation passing through the grating 40 reaches the active surface of the radiation sensor 41. This is possible because the irradiation intensity plays no part in this second embodiment, since the change in distance 14, 17 is determined by pulse counting. If the distance of the irradiated surface 22 from the hand-held power tool 13 changes, the image of the irradiated surface 22 wanders from the first image 27 to the second image 28. On this path, it alternately strikes radiolucent and radiopaque regions of the grating 40. A counting process is then immediately triggered in the signal processing arrangement 34, whose results are a measure for the change in the distance 14, 17.

FIG. 4 shows a third embodiment of the radiation receiver. It is an advantageous modification of the second embodiment according to FIG. 3. This arrangement also makes it possible to detect the direction of the change in the distance, in addition to the change in the distance 14, 17. The first optical structural component element 40', and the second optical structural component element 40" are arranged adjacent to one another. Both elements 40', 40" comprise radiolucent regions 42, 44 and radiopaque regions 43, 45. These regions are arranged at a determined offset 46 relative to one another. A first 41', and second 41" radiation sensors are provided behind the optical structural component elements 40', 40", which are preferably constructed as gratings. The two radiation sensors 41', 41" transmit an output signal to the signal processing arrangement 34 when a radiation passes through radiolucent regions 42, 44 of the two gratings 40', 40". The magnitude of the image of the irradiated surface 22 must be dimensioned in such a way that both radiation sensors 41', 41" can constantly receive a radiation signal. In an advantageous manner, the diaphragm 12 arranged in front of the first lens 10 is constructed as a slit diaphragm, so that a stroke-shaped pattern is projected on the irradiated surface 22, whose image in the image area 25 behind the second lens 24 likewise results in a dash-shaped radiation pattern 47. A change in the distance 14, 17, in connection with the offset 46 of the two gratings 40', 40", leads to signals of the radiation sensors 41', 41" which are offset with respect to time. The direction of the change in distance is determined from signals in the signal processing arrangement 34.

FIG. 5 shows a fourth embodiment of the radiation receiver. The radiation 26 reflected by the irradiated surface 22 strikes the radiation sensor 50 after passing through the second lens 24. The active surface of the sensor 50 is located in the image area 25 in which images 27, 28 of the surface 22 lie. The radiation sensor 50 comprises a plurality of individual sensors arranged adjacent to one another. Photodiode lines or charged-coupled device lines can be used. The sensor line 50 provides an output signal in the signal processing arrangement 34, wherein the position of the images 27, 28 can be determined directly by a multiple-receiver arrangement.

A position-sensitive photodiode which has recently become available can also be used as the radiation sensor 50. This position-sensitive photodiode, which is planar, works like an optical potentiometer. A current flowing through it is a unequivocal function of the point of incidence of the radiation on the active surface. The current signal is evaluated in the signal processing arrangement 34, and the position of the images 27, 28 is determined.

FIG. 6 shows the block wiring diagram of the optoelectronic circuit arrangement. The radiation source 11 is controlled by a pulse generator 60. Timed operation of the radiation source 11 makes possible an increase in the achievable signal-to-noise ratio by an increase in the radiation output of the radiation source 11 with a simultaneous economy of energy. When a semiconductor radiation source is used, e.g. a light diode, it is possible to considerably increase the pulse spike output in timed operation by varying the pulse-duty factor while maintaining the maximum allowable continuous output. A high pulse radiation output reduces the required sensitivity of the radiation sensor. Influences of external radiation portions on the measurement results, which can occur because of artificial illumination of the object 16 to be machined or by an ambient light, are eliminated by an electronic filter arrangement in the signal processing arrangement 34 by blanking out signal portions having a different frequency than the frequency predetermined by the timed operation.

The signal processing arrangement 34 determines the distance 14, 17 and the change in distance of the irradiated surface 22 of the hand-held power tool 13 from the position of the images 27, 28. If the hand-held power tool 13 is a drilling machine, the change in the distance 14, 17 is immediately a measurement of the achieved bore-hole depth. The optoelectronic arrangement according to FIG. 6 must be secured to the hand-held power tool 13 in order to carry out this task. The arrangement can be installed, for example, in the housing of the hand-held power tool 13, but it is also possible to install the entire arrangement in a handle which is mounted on or in a housing which is flanged on. An arrangement in the handle of the power tool 13 has the advantage that the distance measuring device can be offered as an accessory. The circuit arrangement is preferably equipped with a battery when being located in the handle. The timed operation of the radiation source 11 is then utilized for reducing the energy requirement of the radiation source 11, so that the time intervals between exchange of batteries is lengthened.

The signal processing arrangement comprises at least one optical output device 62 for indicating the distance 14, 17 and the achieved bore depth, respectively. Moreover, an acoustic output device 63 and an input device 64 are provided. With the input device 64, it is possible to input a predetermined value of the bore depth into the signal processing arrangement 34, the drilling machine 13 being automatically switched off when this bore depth is reached. An acoustic signal can be transmitted shortly before reaching the predetermined depth of the bore hole by the acoustic output device 63. The acoustic signal alerts the operator of the drilling machine 13 to reduce the feed force. When using this method, exceeding of the predetermined depth of the bore, which occurs particularly in soft materials, is easily avoidable. The operator receives additional information from a continuous display of the bore depth reached on the indicating device 62. In another operation, it is also possible to indicate the difference remaining until the predetermined depth is reached. The threshold value prior to reaching the predetermined depth at which the acoustic signal is triggered can likewise be conveyed via the input device 64 of the signal processing arrangement 34. The approaching of the predetermined depth of the bore depth can also be indicated by the optical indicating device 62, e.g. by blinking or changing the color of the display. The continuous measurement of the bore depth reached presupposes that the signal processing arrangement 34 was returned to an initial state at the beginning of the drilling process. This zero setting can be triggered e.g. by the switching on the drilling machine 13, but it is more advantageous if the zero position is effected via the input device 64. Accordingly, an occasional switching off of the drilling machine 13 during the drilling operation does not influence the results.

The bore depth range is considerably enlarged relative to known measuring devices. Distances up to 0.5 meters can be processed easily—this is sufficient for all reasonable drill bit lengths. The measuring accuracy is high because of an unequivocal reference point of measurement (irradiated surface 22) immediately adjacent to the bore. The reference point is visible if the light diode 11 emits a radiation in the visible spectral range.

While the invention has been illustrated and described with reference to specific embodiments, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. An optical depth measuring device to be mounted on a drilling power tool for drilling a bore in a workpiece, said optical depth measuring device comprising:
   a radiation source for projecting an optical pattern onto a surface of the workpiece;
   at least one radiation receiver having an image area for receiving an image reflected from the surface of the workpiece;
   a converging lens having a focal point and located in front of said radiation sensor, said image area being located in said focal point; and
   signal processing means for continuously determining a depth of the drilled bore by a triangulation method in accordance with the image received by said radiation sensor, said signal processing means comprising means for indicating the determined bore depth.

2. An optical depth measuring device according to claim 1 wherein said indicating means comprises optical display means for optically displaying the depth of the drilled bore.

3. An optical depth measuring device according to claim 1 wherein said indicating means comprises output acoustic means for generating an acoustic signal.

4. An optical depth measuring device according to claim 3 wherein said output acoustic means are arranged to generate the acoustic signal when the depth of the drilled bore reaches a magnitude which is less than a predetermined depth by a predetermined value.

5. An optical depth measuring device according to claim 1 wherein said signal processing means includes input means for receiving data determining a predetermined depth of the drilled bore; and said indicating means comprises optical display means for displaying the depth of the drilled bore, and output acoustic means for generating an acoustic signal when the depth of the drilled bore reaches a magnitude which is less than a predetermined depth of the drilled bore by a predetermined value.

6. An optical depth measuring device according to claim 1 wherein said radiation source is formed to project a point onto the surface of the workpiece.

7. An optical depth measuring device according to claim 1 wherein said radiation source is formed to project a line onto the surface of the workpiece.

8. An optical depth measuring device according to claim 1 wherein said signal processing means includes input means for inputting data determining a predetermined depth of the drilled hole into said signal processing means.

9. An optical depth measuring device according to claim 1, further comprising a second lens having a focal point and located between said radiation source and the workpiece, said radiation source being located in the focal point of said second lens.

* * * * *